Sept. 24, 1940.   H. H. HATHAWAY   2,215,612

FISHHOOK

Filed Jan. 18, 1938    2 Sheets-Sheet 1

INVENTOR
HARLOW H. HATHAWAY.
BY Earl E Moore ATTY.

Sept. 24, 1940.  H. H. HATHAWAY  2,215,612
FISHHOOK
Filed Jan. 18, 1938  2 Sheets-Sheet 2

INVENTOR.
HARLOW H. HATHAWAY.
BY Earl E. Moore ATTY.

Patented Sept. 24, 1940

2,215,612

UNITED STATES PATENT OFFICE 2,215,612

FISHHOOK

Harlow H. Hathaway, Los Angeles, Calif.

Application January 18, 1938, Serial No. 185,533

4 Claims. (Cl. 43—40)

This invention relates to fishhooks in which means are provided for holding live bait in a manner so as to maintain the bait in a live state, it being unnecessary to injure the bait or pierce its body in accordance with common practice. The advantages and desirabilities of such a hook performing such a feature are beyond conjecture in that fishermen have long recognized that greater yield is obtained by using live bait. Furthermore, timid persons need not injure the bait, thus making their fishing sojourn more pleasant.

This invention, when applied to standard types of hooks does not in any way interfere with the proper and normal use of its spears and barbs, but leaves them clear of obstruction. The invention may be applied to the bend of the fishhook or above the normal shank of the hook, but it is preferable to apply it to the shank proper.

When applied to the shank, the invention consists of an elongated rib or wire-like splint having one of its ends soldered, welded, twisted or otherwise fixed to the center, bottom or top portion of the fishhook. Should only one end of the splint be fixed to either the top or bottom portion of the hook, the other end is generally provided with or configurated to form a hook-like element to clasp the opposite end of the fishhook. By having one end of the splint so removable, a part of the bait may be placed between the hook and splint for holding the bait securely in place upon clasping the splint to the hook shank or other convenient part of the hook. When the bait is so held to the hook, it is not injured and may, therefore, when fishing is poor, greatly economize in the use of bait.

The splint is preferably made of spring steel, although other metals or materials may be used, and so fixed to some portion of the hook body that it is bowed when pulled from the hook, leaving sufficient space into which the bait is inserted. Should the user of the improved hook, herein disclosed, wish to keep the bait alive for relatively long periods of time, or even short periods of time to permit the bait to have freedom of motion and thus great attractiveness to other fish, the bait may have just one of its fins inserted and held between the splint and shank of the hook. Therefore, the means employed in this invention, permits the bait to freely squirm and wiggle for an indefinite period so as to always appear attractive and alluring to fish of the sea and, particularly, to game fish. The shank of the hook or the splint may be barbed, serrated, or otherwise roughened so that the fin of the bait can be held securely with no possibility of escape.

Should the splint or the hook body, or both, be roughened in the manner disclosed above, the free end of the splint may not necessarily be configurated or provided with means to clasp the fishhook, but the spring action of the splint alone may be relied upon to hold the bait against the body of the hook.

Although applicant prefers to adapt his invention to standard sized hooks and styles, he does not wish to be so restricted in that it may be to his advantage to design special hooks to which his invention can be adapted.

An object of the invention is to present a fishhook having means for holding bait in a manner not to injure the bait so as to keep it in a fresh and active condition.

Another object is to provide a fishhook that is designed to hold live bait by its fin or other thin part of its body so that the bait will indefinitely be attractive and alluring to fish desired to be caught.

Still another object is the provision of a fishhook in combination with a holding means for bait, the holding means permitting the bait to be held in certain predetermined positions with respect to the body of the hook.

Still further objects will become apparent from reading the specification and its preamble and also from scrutinizing the drawings made a part hereof.

In order to teach one how to make, use and vend the invention herein disclosed, several forms thereof are shown, but, it is to be understood, that the particular forms shown and described are not to limit the scope thereof, except as limited by the appended claims.

Figure 1:
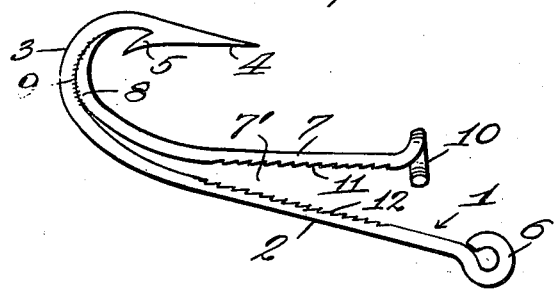
Fig. 1 shows one form of the invention in perspective view with the binder open to receive the bait.
Figure 3:
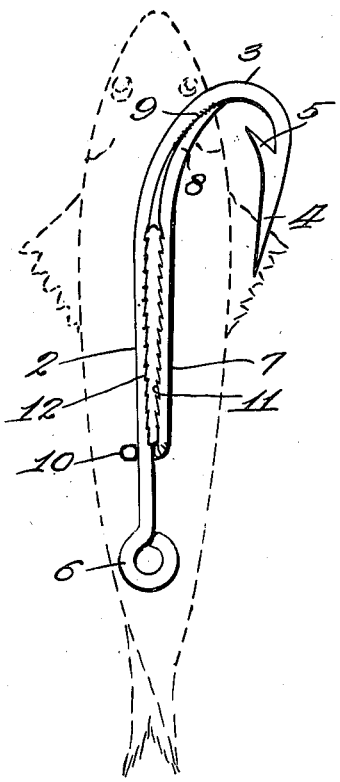
Fig. 3 shows the same hook again with the binder closed and the fin of the bait firmly held in place.
Figure 2:
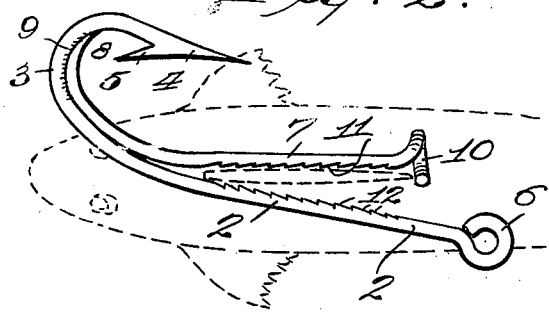
Fig. 2 shows the same hook of Fig. 1 with a fin of the bait in the gap of the binder.

The form of the invention shown in Figs. 1, 2 and 3 of the drawings comprises a regular and standard type of fishhook designated by the reference numeral 1 having the usual shank 2 which may be straight or substantially straight. Integral therewith, at one end, is the usual bent or curved portion 3, U-like shaped, which terminates in the form of a spear head 4 having a barb 5. More than one barb may be placed upon the hook if desirable, but for the sake of simplicity, only one barb is shown. The other end of the shank 2 has the usual eyelet 6 or similar element, to which the fisherman's line is attached.

The reference character 7 represents a rib, tang, or splint which cooperates with the shank 2 of the hook to form the binder; the space or gap 7' between the splint and shank, when open, receives the bait, generally the fin of a small fish, or perhaps the leg or wing of a bug. When a worm or the like is used as bait, its body is placed in the gap and pressed between the tang and shank. The splint 7, at one end, denoted by 8, is bent to coincide with the configuration of the hook portion 3 and soldered, welded or otherwise firmly fixed thereto as at 9. The other end of the splint is bent or looped to form a clasp 10 of proper form so that when the splint is forced into juxtaposition and parallel with the shank 2, the clasp can be fastened to the shank in the manner shown in Fig. 3.

The kind of material used to make either splint or hook is of little moment providing the material is sufficiently strong and serves the purpose well. It is preferable, however, that the splints 7 be made of spring steel or metal having resilient qualities so that its free end will readily spring from the shank when released therefrom.

The splint and/or shank may be roughened or serrated as shown at 11 and 12 respectively, so as to more securely hold the bait, or fin of the bait, therebetween.

Figure 4:
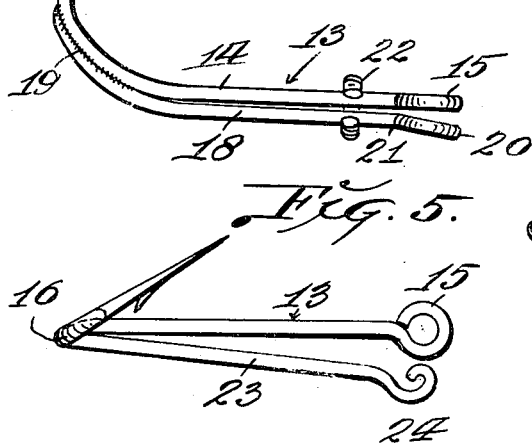
Fig. 4 shows in perspective view another form of the invention.

Fig. 4 shows another form of the invention as applied to a standard fishhook 13 similar to that shown in Figs. 1, 2 and 3. This hook also having a shank 14 an eyelet as at 15, curved portion 16 and barbed spear 17.

A splint 18, having the form of the hook elements 14 and 16, is welded thereto as at 19 and at its other end is provided with an eyelet 20. The splint is bent as at 21 so that the eyelet 20 is not parallel with eyelet 15 when the hook shank 14 and splint 18 are in alinement.

A C-shaped element 22 has one of its cavities welded or soldered to the splint near its eyelet. The opposite cavity of the element 22 provides a clasp to receive the upper shank of the hook.

As in the form of the invention shown in Figs. 1, 2 and 3, the fin of the bait can be securely held between the hook shank 14 and the splint 18 when closed or bound together. The purpose for inclining the eyelet 20 away from the eyelet 15 is to enable the operator thereof to separate the two with comparative ease.

Figure 5:
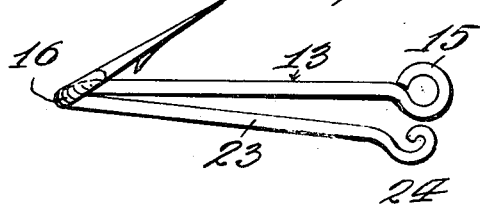
Fig. 5 shows in perspective another form of the invention.

The modified form shown in Fig. 5 employs the usual fishhook and has welded thereto within the cavity of the bend 16 the curved section of one end of a splint 23. The other end of the splint is bent in the form shown to make the clasp 24. The splint is sprung so that when its clasp 24 is released from the eyelet 15, it will automatically open.

Figure 6:
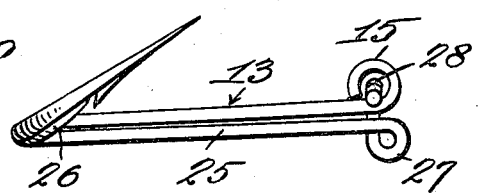
Fig. 6 shows in perspective another form of the invention.

The modified form of Fig. 6 shows the usual fishhook 13 juxtapositioned to a splint 25, the lower curved portion 26 thereof being welded to the side of the hook's curved portion 16. The free end of the splint is looped at 27 and then bent at 28 as shown to form a clasp to receive the eyelet 15 of the hook.

Figure 7:
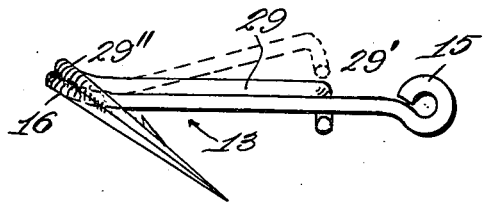
Fig. 7 shows in perspective another form of the invention.

The modified form of Fig. 7 also employs the usual fishhook 13 having the eyelet 15 and curved portion 16. The splint or tang 29 in this form has an eyelet 29' at one end designed to clasp the upper shank of the hook 13 and a curved portion 29'' welded to a side of the hook's curved portion 16. When the tang is released as shown in dotted lines, it will automatically spring away from the shank and be in position to receive the bait.

Figure 8:
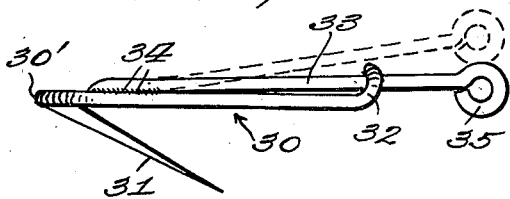
Fig. 8 shows in perspective another form of the invention.

Fig. 8 shows a fishhook 30 made and adapted especially for applicant's invention. The fishhook has the usual curve portion 30' and spear 31 at one end and at the other end a curved clasp portion 32 configurated as shown to clamp on to a splint 33. The splint 33 is soldered or welded to the lower end of the shank of the hook 30 as at 34 and is provided at the other end of it with an eyelet 35 to receive the fishing line.

Figure 9:
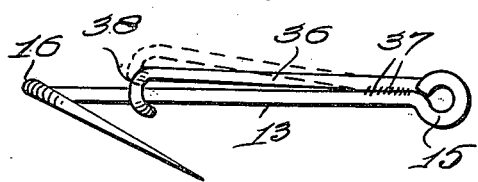
Fig. 9 shows in perspective another form of the invention.

Fig. 9 shows still another modification adapted to combine with the usual fishhook 13. In this form of the invention, one end of the splint 36 is welded as at 37 near the eyelet of the hook 13 whereas the other end of the splint is curved as shown at 38 to provide a clasp to clamp the lower part of the shank of the fishhook.

Figure 10:
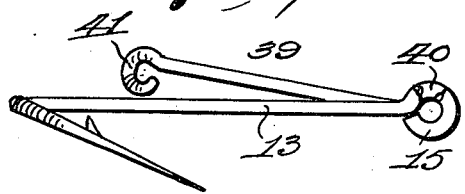
Fig. 10 shows in perspective another form of the invention.

Fig. 10 shows still another modification employing the usual fishhook 13 having the usual eyelet 15. The splint 39 of this form of the invention has one end thereof formed into an eyelet 40 which is welded in concentric relation with the eyelet 15 of the fishhook. The other end of the splint is provided with a curved portion 41, in the form shown, to grip the lower part of the shank of the fishhook and adapted to being clasped into engagement therewith.

Figure 11:
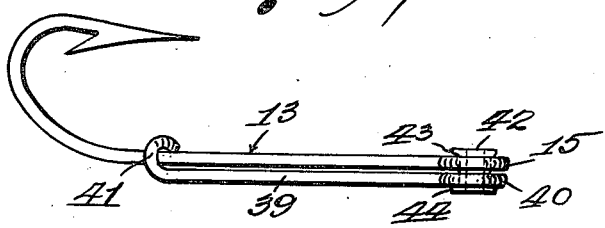
Fig. 11 shows in perspective another form of the invention.

The form of the invention shown in Fig. 11 is very similar to that shown in Fig. 10 in that it comprises the usual fishhook 13 having the usual eyelet 15 and also having the splint 39 as shown in Fig. 10 with its eyelet 40 and curved portion 41. In this form of the invention, however, the two eyelets 15 and 40 are not welded together but are pivoted together by a hollow tube-like rivet 42 having its ends flared as at 43 and 44 so as to hold the two eyelets in juxtaposition. The pivot permits the splint to turn so that the clasp 41 may be clamped to the shank of the fishhook and released therefrom.

Figure 12:
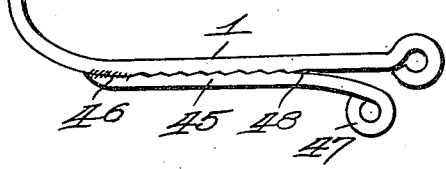
Figure 12 shows still another form of the invention in elevation.

The modified form shown in Fig. 12 also utilizes a standard type hook like the one shown in Fig. 1 and referred to by the reference numeral 1. In this form, a splint 45 is welded at 46 to the lower part of the shank of the hook. The splint is made of spring steel and is so welded to the shank that the splint will automatically return to the shank of the hook, as shown in Fig. 12, when pulled away therefrom.

The splint is provided with an integral loop 47 and is slightly bent away for the shank at 48 so that the loop can be easily grasped and forced away from the shank when it is desired to place bait between the splint and shank. The normal position of the hook shank and splint is shown in Fig. 12, and in order to place bait between them, the free ends of the shank and splint must be grasped and pulled apart. The spring as of the splint, when released, is sufficient to hold the bait firmly. The serrated part of the shank and splint materially aids in holding the bait and prevents its slippage.

Having thus described my invention, I claim the following:

1. A fishhook having a hook portion, a shank fixed to said portion, elongated means for holding bait having one end thereof fixed to the hook portion and the other end formed with means to clasp the shank of the hook.

2. In a fishing device, a hook element and a tang element, an end of one of the elements being fixed to a portion of the other element removed from its longitudinal center, means at the free ends of the elements for holding said ends together, one of said elements having serrations substantially along its entire length for holding live bait when placed between said elements.

3. In a fishhook device, an elongated shank having ends with a hook at one of the ends thereof, an elongated tang having one end thereof fixed to the shank near an end of same, said shank and tang extending in the same general direction and having opposing faces, one of the faces having a roughened surface so that when live bait is placed between the faces, sufficient friction will prevent loss of the bait.

4. In a fishing device, a hook having a long shank element, a long tang element fixed to the hook, said elements being arranged to be sprung apart for receiving bait, frictional means along substantially the entire length of one of the elements to positively prevent the bait from slipping from between the elements.

HARLOW H. HATHAWAY.